(12) United States Patent
Bertin

(10) Patent No.: US 12,163,811 B2
(45) Date of Patent: Dec. 10, 2024

(54) INDUCTIVE ANGULAR POSITION SENSOR

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 152 days.

(21) Appl. No.: 17/822,604

(22) Filed: Aug. 26, 2022

(65) Prior Publication Data

US 2024/0068843 A1    Feb. 29, 2024

(51) Int. Cl.
*G01D 5/20* (2006.01)
(52) U.S. Cl.
CPC .............. *G01D 5/206* (2013.01); *G01D 5/204* (2013.01); *G01D 5/2066* (2013.01); *G01D 5/2086* (2013.01)
(58) Field of Classification Search
CPC .... G01D 5/204; G01D 5/2053; G01D 5/2086; G01D 5/22; G01D 5/225; G01D 5/2275; G01D 5/2283
See application file for complete search history.

(56) References Cited

U.S. PATENT DOCUMENTS

| 6,384,598 B1 * | 5/2002 | Hobein ................ G01D 5/2046 318/660 |
| 2006/0250128 A1 * | 11/2006 | Tahara ................ G01D 5/2086 324/207.25 |
| 2007/0018658 A1 * | 1/2007 | Hayashida ............... G01B 3/18 324/650 |
| 2008/0223942 A1 | 9/2008 | Ishii et al. |

(Continued)

FOREIGN PATENT DOCUMENTS

| EP | 3901582 A1 | 10/2021 |
| JP | 2005-265518 A | 9/2005 |

OTHER PUBLICATIONS

Gao et al. "A Contactless Planar Inductive Sensor for Absolute Angular Displacement Measurement", IEEE Access, vol. 9, 2021, pp. 160878-160886.

(Continued)

*Primary Examiner* — Steven L Yeninas
(74) *Attorney, Agent, or Firm* — Brake Hughes Bellermann LLP

(57) ABSTRACT

A receiver coil of an inductive angular position sensor can have circuit features that become smaller than reasonable for high resolution measurement designs. This is especially true when multiple receiver coils are used, such as in a three-phase configuration, and when each of the multiple receiver coils is in a twisted loop configuration. The disclosed inductive angular position sensor utilizes different spatial frequencies for a rotor coil and the receiver coils. For (Continued)

example, the spatial frequency of the receiver coils may be kept smaller than the rotor coil. In this condition, the fundamental frequency of the angular position sensor is shifted to the least common multiple of the spatial frequencies, making the angular resolution of the inductive angular position sensor high, while the circuit features of the receiver coils are maintained at a reasonable size.

21 Claims, 11 Drawing Sheets

(56) References Cited

U.S. PATENT DOCUMENTS

| | | | |
|---|---|---|---|
| 2013/0187639 A1* | 7/2013 | Sasaki | G01B 7/30 |
| | | | 324/207.17 |
| 2017/0292858 A1* | 10/2017 | Howard | G01D 5/204 |
| 2020/0200569 A1* | 6/2020 | Utermoehlen | G01D 5/204 |
| 2021/0190611 A1* | 6/2021 | Liang | G01L 3/105 |
| 2021/0215511 A1 | 7/2021 | Kawatoko et al. | |
| 2022/0291022 A1* | 9/2022 | Shimahara | G01D 5/204 |

OTHER PUBLICATIONS

Shao, "Automotive Inductive Position Sensor", Electronic Thesis and Dissertation Repository, 2017, 139 pages.
Extended European Search Report for counterpart European Patent Application No. 23184864.9, mailed Jan. 24, 2024, 14 pages.

* cited by examiner

INDUCTIVE ANGULAR POSITION SENSOR

FIELD OF THE DISCLOSURE

The present disclosure relates to position sensors and more specifically to an inductive angular position sensor that can provide high angular resolution with low resolution circuitry.

BACKGROUND

Many applications requiring movement, such as automotive, robotic, etc., require measurements of linear or angular position (e.g., pedal angle, arm angle, etc.). An inductive position sensor is desirable for such applications because it can provide accurate measurements while withstanding tough environmental conditions. Increasing a resolution of these sensors may be desirable but can be limited by a corresponding increase in the cost of fabrication required by high-resolution circuitry.

SUMMARY

In some aspects, the techniques described herein relate to an inductive angular position sensor including: an excitation coil located at a first plane, the excitation coil having a circular shape around an axis-of-symmetry that intersects the first plane at a center of the excitation coil; a rotor coil having a first rotational symmetry of a first order about the axis-of-symmetry, the rotor coil located at a second plane separated from the first plane by an air gap and configured to rotate around the axis-of-symmetry, wherein the rotor coil is configured to receive an excitation signal from the excitation coil through an exciter-to-rotor inductive coupling; and a receiver coil having a second rotational symmetry of a second order about the axis-of-symmetry, the receiver coil located in the first plane and configured to generate a received signal based on a rotor-to-receiver inductive coupling which changes sinusoidally as the rotor coil rotates, wherein the first order and the second order are different.

In some aspects, the techniques described herein relate to an inductive angular position sensor, wherein the second order is less than the first order.

In some aspects, the techniques described herein relate to an inductive angular position sensor, wherein the received signal has a fundamental frequency that is a least common multiple of the first order and the second order.

In some aspects, the techniques described herein relate to an inductive angular position sensor, wherein a period of the fundamental frequency corresponds to a range of rotation of the rotor coil that is 360 degrees divided by the least common multiple of the first order and the second order.

In some aspects, the techniques described herein relate to an inductive angular position sensor, wherein the first order of the first rotational symmetry of the rotor coil is a multiple of the second order of the second rotational symmetry of the receiver coil.

In some aspects, the techniques described herein relate to an inductive angular position sensor, wherein the receiver coil is in a twisted loop configuration.

In some aspects, the techniques described herein relate to an inductive angular position sensor, wherein the receiver coil is a first receiver coil, and the inductive angular position sensor further includes: a second receiver coil in the twisted loop configuration that is positioned around the axis-of-symmetry by 120 degrees relative to the first receiver coil; and a third receiver coil in the twisted loop configuration that is positioned around the axis-of-symmetry by 240 degrees relative to the first receiver coil.

In some aspects, the techniques described herein relate to an inductive angular position sensor, wherein the receiver coil includes a trace that alternates between on a top surface of a printed circuit board and a bottom surface of the printed circuit board at vias through the printed circuit board.

In some aspects, the techniques described herein relate to an inductive angular position sensor, wherein the rotor coil and the receiver coil are outside an interior of excitation coil.

In some aspects, the techniques described herein relate to an inductive angular position sensor, wherein the rotor coil is a multi-winding rotor coil including a first winding having a first lobe ratio and a second winding having a second lobe ratio.

In some aspects, the techniques described herein relate to a position sensor system including: an inductive angular position sensor that includes: an excitation coil located at a first plane, the excitation coil having a circular shape around an axis-of-symmetry that intersects the first plane at a center of the excitation coil; a rotor coil having a first rotational symmetry of a first order about the axis-of-symmetry, the rotor coil located at a second plane separated from the first plane by an air gap and configured to rotate around the axis-of-symmetry, wherein the rotor coil is configured to receive an excitation signal from the excitation coil through an exciter-to-rotor inductive coupling; and a plurality of receiver coils configured to generate a plurality of received signals, each of the plurality of receiver coils having a second rotational symmetry of a second order about the axis-of-symmetry that is less than the first order, the plurality of receiver coils configured to generate a plurality of received signals; a transceiver circuit connected to the excitation coil and configured to generate the excitation signal and further configured to receive the plurality of received signals from the plurality of receiver coils, the plurality of received signals having a fundamental frequency that is a multiple of the first order and the second order; and an angle calculation module configured to calculate an angle measurement based on the plurality of received signals.

In some aspects, the techniques described herein relate to a position sensor system, wherein the fundamental frequency is a least common multiple of the first order and the second order.

In some aspects, the techniques described herein relate to a position sensor system, wherein the plurality of receiver coils are each in a twisted loop configuration.

In some aspects, the techniques described herein relate to a position sensor system, wherein the plurality of receiver coils include a first receiver coil, a second receiver coil, and a third receiver coil arranged in a three-phase configuration in which the first receiver coil, the second receiver coil, and the third receiver coil are arranged at 120 degree angles about the axis-of-symmetry with each other.

In some aspects, the techniques described herein relate to a position sensor system, further including a processing module configured to transform a first received signal from the first receiver coil, a second received signal from the second receiver coil, and a third received signal from the third receiver coil into a pair of quadrature signals.

In some aspects, the techniques described herein relate to a position sensor system, wherein the rotor coil has a first angular period corresponding to the first rotational symmetry and the plurality of receiver coils each have a second angular period corresponding to the second rotational symmetry, and the angle measurement has a resolution that is smaller than the first angular period and the second angular period.

In some aspects, the techniques described herein relate to a position sensor system, wherein the rotor coil is a multi-winding rotor coil including a first winding having a first lobe ratio and a second winding having a second lobe ratio.

In some aspects, the techniques described herein relate to a method for measuring an angle including: generating a first magnetic field using an excitation coil located at a first plane, the excitation coil being symmetric about an axis-of-symmetry; rotating a rotor coil about the axis-of-symmetry to the angle, the rotor coil at a second plane parallel to the first plane and separated from the first plane by an air gap, the rotor coil having a first spatial frequency; coupling the first magnetic field from the excitation coil to the rotor coil to generate a current in the rotor coil; coupling a second magnetic field generated by the current in the rotor coil to a receiver coil at the first plane, the receiver coil having a second spatial frequency; receiving a received signal from the receiver coil, the received signal having an amplitude corresponding to the angle of the rotor coil; and comparing the received signal from the receiver coil to a sinusoidal signal to measure the angle, the sinusoidal signal having a fundamental frequency corresponding to a least common multiple of the first spatial frequency and the second spatial frequency.

In some aspects, the techniques described herein relate to a method for measuring the angle, wherein the second spatial frequency of the receiver coil is less than the first spatial frequency of the rotor coil.

In some aspects, the techniques described herein relate to a method for measuring the angle, wherein a sensor resolution of the angle is higher than a first resolution corresponding to the first spatial frequency or a second resolution corresponding to the second spatial frequency.

In some aspects, the techniques described herein relate to a method for measuring the angle, wherein the rotor coil is a multi-winding rotor coil including a first winding having a first lobe ratio and a second winding having a second lobe ratio.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

An inductive angular position sensor can include three basic coils: an exciter coil (i.e., excitation coil), a stator coil (i.e., receiver coil), and a target coil (i.e., rotor coil). The rotor coil may be physically attached to a moving part while the excitation coil and the receiver coil are in a fixed position. As the rotor coil moves, changes in the inductive coupling between the rotor coil and the receiver coil can be sensed and mapped to corresponding changes in the position of the moving part. In practice, each of these basic coils may be made more complex in order to improve performance. These improvements may include mitigating stray inductive coupling, removing ambiguity from angular measurements, reducing harmonic distortion, and increasing resolution.

Added complexity to improve performance can require coils that can be difficult to fabricate in a cost-efficient manner. For example, trace widths, trace separation, via size (e.g., diameter) may be too small for standard fabrication techniques. The present disclosure describes a technique to improve performance of the inductive position sensor while maintaining a reasonable size for standard fabrication techniques. In particular, the disclosure describes techniques to increase a resolution of an inductive angular position sensor with a reduced circuit size and complexity. The disclosure further discloses a possible implementation of the high-resolution, low-complexity inductive angular position sensor in which the rotor design reduces harmonic distortion.

Figure 1:
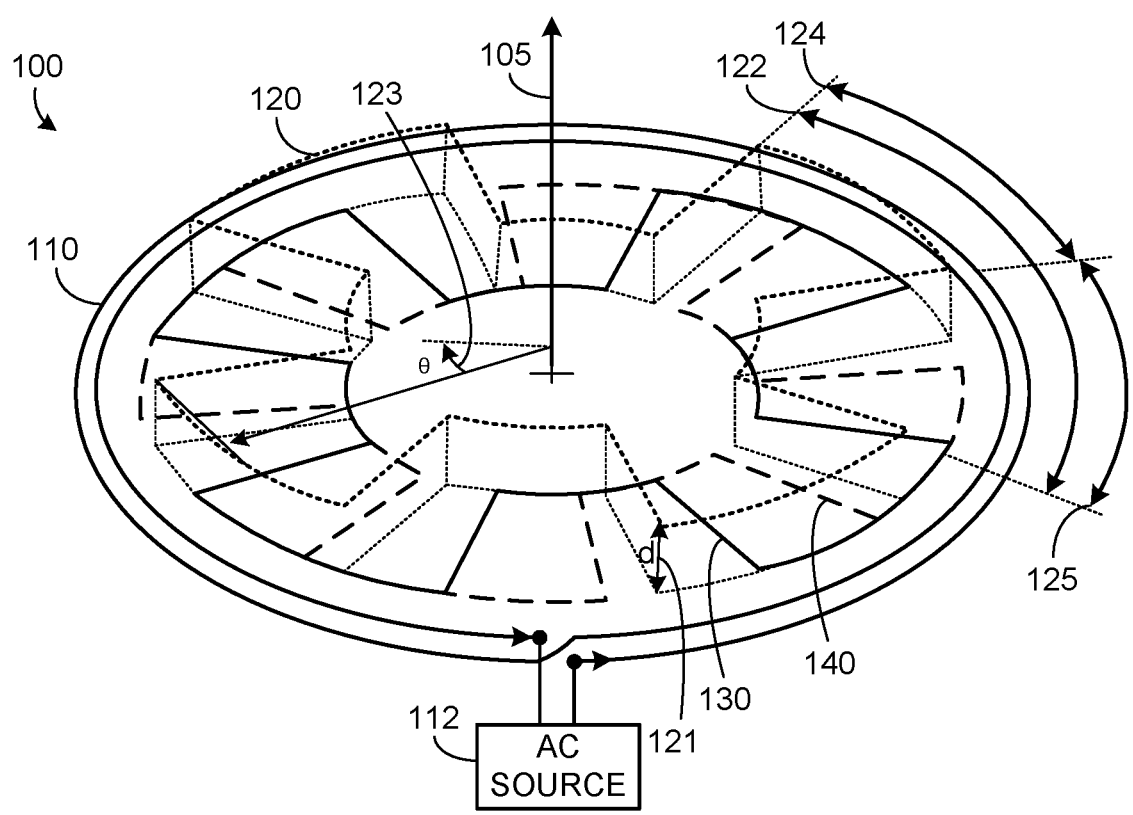
FIG. 1 is a (prior art) schematic of an inductive angular position sensor according to certain embodiments.

FIG. 1 illustrates a basic inductive angular position sensor. The inductive angular position sensor 100 includes an excitation coil 110. The excitation coil 110 is stationary and can be coupled to an alternating current source (i.e., AC source 112). The AC source 112 is configured to generate an excitation signal at a frequency (e.g., radio frequency (RF)), which can be in a megahertz (MHz) range of the electromagnetic spectrum. The excitation coil 110 is planar and defines a first plane. Current in the excitation coil 110 can generate an excitation (magnetic) field transverse to the first plane. The excitation coil has a circular shape that is substantially symmetric around an axis-of-symmetry 105 that is located at the center of the excitation coil and that is transverse to the plane of the excitation coil. For example, the excitation coil may be a spiral having multiple turns. The spiral may form a ring (or an annulus) and the other coils may be located within the ring (or annulus), as shown, or outside the ring (or annulus).

The inductive angular position sensor 100 further includes a rotor coil 120 (i.e., target coil). The rotor coil is planar and defines a second plane, which is separated from the first plane by an air gap 121 ($d$). The inductive coupling between the excitation coil 110 and the rotor coil 120 (i.e., exciter-to-rotor inductive coupling) is independent of the angle ($\theta$) but is a function of the air gap 121. For example, the exciter-to-rotor inductive coupling decreases as the air gap 121 is made larger.

The rotor coil 120 may be planar and movable and may be rotated to an angle 123 ($\theta$) about the axis-of-symmetry 105 that intercepts the plane of the rotor coil at the center of the rotor coil. The rotor coil 120 forms a pattern with an angular ($\theta$) dependency that repeats (i.e., has a rotational symmetry). The pattern includes a plurality of lobes, and as shown in FIG. 1, the rotor coil has four lobes positioned regularly around the axis 105. Each lobe has a period 122 that includes a positive portion (i.e., positive lobe 124) and a negative portion (i.e., negative lobe 125). The positive lobe, shown in FIG. 1, is defined as a portion of the rotor coil at a first radius from the axis-of-symmetry 105 and the negative lobe is a portion of the rotor coil at a second radius from the axis-of-symmetry 105, where the first radius is larger than the second radius. In other words, the rotor coil may be rotationally symmetric around the axis-of-symmetry 105 where an order of the rotational symmetry may correspond to the number of lobes (i.e., periods). For example, the rotor coil 120 has a rotational symmetry of the $4^{th}$ order (i.e., symmetry of 4).

The rotor coil 120 is configured to receive the excitation signal from the excitation coil 110 through exciter-to-rotor inductive coupling (i.e., coupling). The magnetic field coupled from the excitation coil can induce a current to flow in the rotor coil 120, which in turn, may generate a secondary field corresponding to the excitation signal.

The inductive angular position sensor 100 further includes a plurality of receiver coils configured to receive the secondary field of the rotor coil 120 through inductive coupling (i.e., coupling) between the rotor coil 120 and the receiver coils. The plurality of receiver coils are each planar and are approximately (e.g., ±1000 microns) in the same plane (i.e., the first plane) as the excitation coil 110. Accordingly, coupling between the rotor coil 120 and the receiver coils (i.e., rotor-to-receiver inductive coupling) may be a function of the air gap 121 ($d$). For example, larger air gaps may have less coupling than smaller air gaps. The plurality of receiver coils are stationary relative to the movement (i.e., rotation) of the rotor coil 120.

As shown in FIG. 1, the inductive angular position sensor 100 includes a first receiver coil 130 and a second receiver coil 140. As shown, the first receiver coil 130 forms a first pattern that is substantially the same as the pattern of the rotor coil 120. Likewise, the second receiver coil 140 forms a second pattern that is substantially the same as the pattern of the rotor coil 120. In other words, the first pattern of the first receiver coil 130 is substantially the same as the second pattern of the second receiver coil 140. As shown, the first receiver coil 130 and the second receiver coil 140 have an angular shift of one quarter of the period 122 of rotational symmetry around the axis-of-symmetry 105. In other words, the receiver coils may be spatially rotated relative to each other.

As the rotor coil 120 is rotated about the axis 105, the inductive coupling changes between the rotor coil 120 and the first receiver coil 130. For example, the inductive coupling between the rotor coil 120 and the first receiver coil 130 may be maximum at angles at which the patterns (i.e., positive lobes and negative lobes) are aligned. Conversely, the inductive coupling between the rotor coil 120 and the first receiver coil 130 may be minimum at angles at which the negative lobe 125 of the rotor coil 120 is aligned with the positive lobe 124 of the first receiver coil 130.

A signal received by the first receiver coil 130 may generate a first received signal which varies sinusoidally according to the angle ($\theta$) of the rotor coil. For the implementation shown in FIG. 1, the first received signal may repeat four times during one complete revolution of the rotor coil 120. For the example, shown in FIG. 1, rotating the rotor over a range of angles corresponding to the period 122 of rotational symmetry (i.e., 90 degrees) may correspond to one electrical period of the first received signal. In other words, the first received signal may have a spatial frequency (i.e., frequency) corresponding to the order of rotational symmetry (i.e. 4). Likewise, the second receiver coil 140 may generate a second received signal that varies sinusoidally and repeats four times during one complete revolution of the rotor coil 120. The first received signal and the second received signal may have the same frequency but may be electrically phase shifted relative to each other due to their spatial offset.

An electrical phase shift (e.g., 90° electrical) between the first received signal and the second received signal corresponds to the angular shift (e.g., 22.5° mechanical) between the receiver coils. The first received signal and the second received signal may be in quadrature so the first received signal corresponds to the sine of the angle (i.e., $SIN(\theta)$), and the second received signal corresponds to the cosine of the angle (i.e., $COS(\theta)$). Therefore, an angle ($\theta$) measurement can be computed as the inverse tangent of the received signals, as shown in the Equation below. This inverse tangent calculation approach may be desirable because amplitude changes that are common to the first received signal and the second received signal cancel.

$$\theta = \tan^{-1}(\sin(\theta)/\cos(\theta)) \qquad (1)$$

Figure 2:
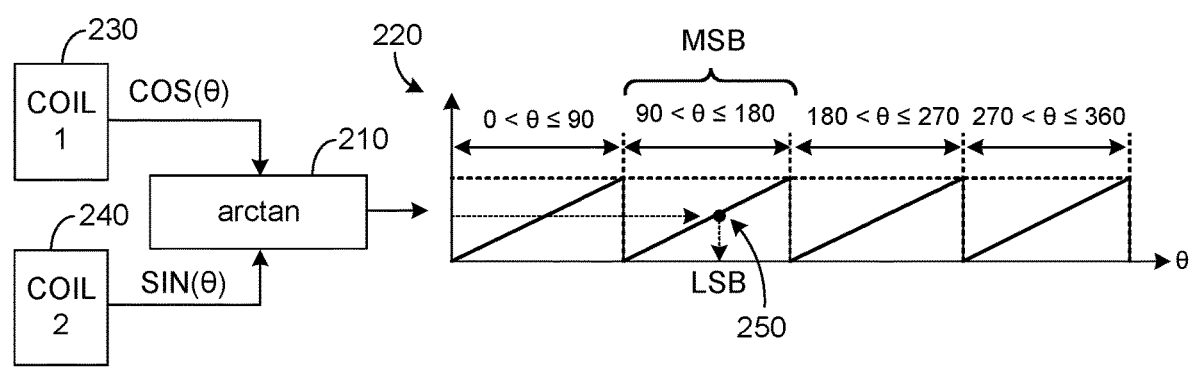
FIG. 2 illustrates an example of an angle calculation according to a possible implementation of the present disclosure.

FIG. 2 illustrates an example of an angle calculation according to a possible implementation of the present disclosure. The angle calculation includes an inverse tangent (i.e., arctan) calculation 210 using a cosine signal ($\cos(\theta)$) from a first coil 230 and a sine signal ($\sin(\theta)$) from a second coil 240. The inverse tangent calculation 210 can output an angle signal 220 that repeats according to the number of periods of the receiver coils. FIG. 2 includes a graph of the angle signal amplitude versus the angle ($\theta$) of the rotor coil for one full rotation (i.e., 360°). Measuring the angle ($\theta$) for a measurement 250 may require first determining which range of angles (i.e., which period) the measurement 250 corresponds to. As shown, the measurement corresponds to the second period, which represents rotor coil angles between 90 and 180 degrees (i.e., 90°<$\theta$≤180°). Next, the angle of the measurement 250 is determined by interpolating between 90 and 180 degrees based on the measurement 250 value and the angle signal 220. In other words, the period determination portion of the angle calculation corresponds to the most significant bit(s) (MSB) of the measurement, while the interpolation portion of the angle calculation corresponds to the least significant bit(s) (LSB) of the measurement.

Increasing the number of periods (i.e., order of rotational symmetry) can make the measurement of angle more precise, but requires more complex (e.g., higher-density) circuitry—especially when additional features are included to improve signal performance (e.g., reduce harmonics). For example, a higher resolution inductive angular position sensor may require narrower trace widths, narrower trace separations, and smaller vias than a lower resolution inductive angular position sensor when the diameters of the two sensors are equal. One technical problem solved by the present disclosure is reducing the number of periods (i.e., number of lobes) of a receiver coil for an angular measurement of a given precision. This may have the technical effect of reducing a cost of fabrication for the inductive angular position sensor 100.

The angle calculation approach shown in FIG. 2 uses two receiver coils. In practice, more receiver coils may be used. For example, four receiver coils can generate a differential (i.e., plus/minus) cosine signal and a differential (i.e., plus/minus) sine signal, which can be used in the inverse tangent calculation approach to compute angle. In another possible implementation, signals from three receiver coils may be processed to obtain the sine signal (SIN(θ)) and cosine signal (COS(θ)) necessary for the inverse tangent calculation approach to compute angle. In what follows, the three-receiver coil implementation will be considered in detail.

Figure 3:
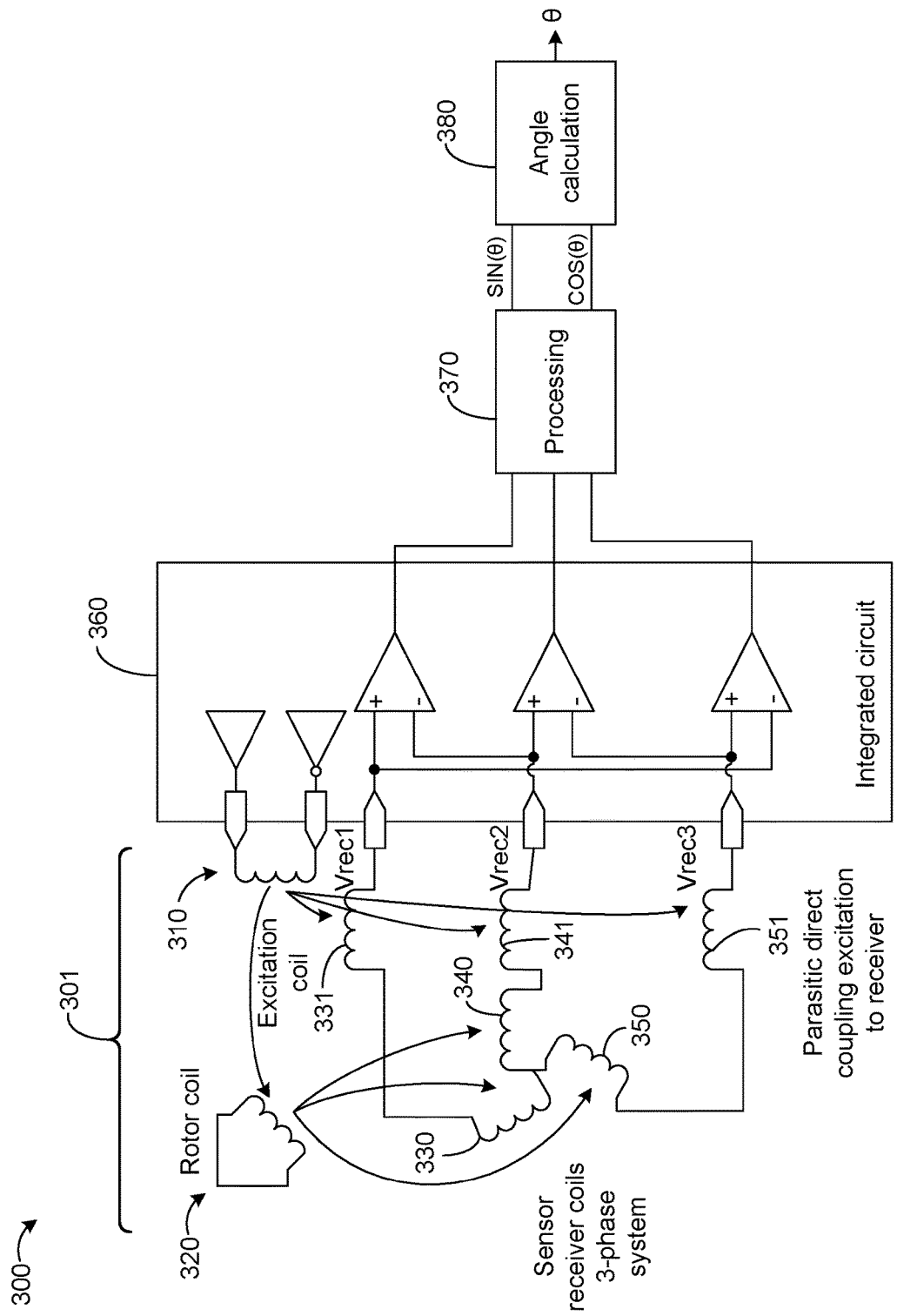
FIG. 3 is a schematic depiction of a position sensor system according to a possible implementation of the present disclosure.

FIG. 3 is a schematic depiction of a position sensor system 300 that includes and inductive angular position sensor 301 having three receiver coils according to a possible implementation of the present disclosure. The inductive angular position sensor 301 includes an excitation coil 310 that is driven (e.g., differentially) with an excitation signal (e.g., 4 MHz). The inductive angular position sensor 301 further includes a rotor coil 320 configured to receive the excitation signal. In other words, the excitation coil is coupled to the rotor coil to induce (i.e., generate) an AC current in the rotor coil. The inductive angular position sensor 301 further includes a first receiver coil 330, a second receiver coil 340, and a third receiver coil 350 arranged in a three-phase configuration, as shown. Each receiver coil is configured to receive a modulated excitation signal from the rotor coil where the modulation depends on the angle between the rotor coil and each receiver coil. The position sensor system 300 further includes a transmitter/receiver circuit (i.e., transceiver circuit 360). The transceiver circuit 360 may include drivers to drive the excitation coil 310 differentially and may further include amplifiers configured to amplify the induced voltage signals from each coil. The position sensor system 300 may further include a processing module 370 configured to transform the received signals from the three receiver coils (i.e., three-phase signals) into quadrature signals (i.e., sin(θ), cos(θ)). In a possible implementation, the processing module is configured to perform a Clarke Transform to generate a sine signal (sin(θ)) and a cosine signal (cos(θ)) from the three-phase signals. The position sensor system 300 may further include an angle calculation module 380 configured to determine an angle based on the quadrature signals, such as described in conjunction with FIG. 2.

The receiver coils include parasitic inductances, which can be caused by the connection between the receiver coils and the transceiver circuit 360. The first receiver coil 330 includes a first parasitic inductance 331, the second receiver coil 340 includes a second parasitic inductance 341, and the third receiver coil 350 includes a third parasitic inductance 351. The parasitic inductances can receive the excitation signal from the excitation coil through inductive coupling. The induced voltage signals of the receiver coils (i.e., received signal) can be given by the equations below.

$$V_{rec1} = A \cdot \sin(\theta) + B1 \quad (2)$$

$$V_{rec2} = A \cdot \sin(\theta + 120) + B2 \quad (3)$$

$$V_{rec3} = A \cdot \sin(\theta + 240) + B3 \quad (4)$$

In these equations, amplitude (A) depends on the air gap 121 (d) and the amplitude of the excitation signal. The offsets B1, B2, and B3 are parasitic voltages that are independent of the rotor coil position. In practice, these parasitic voltages (B1, B2, B3) can be compensated in the system by an additional coil (not shown). The angle (θ) is the angle (in degrees) between the rotor coil and the particular receiver (i.e., stator) coil.

The induced voltage signal of the second receiver coil 340 has a phase shift of 120 degrees relative to the induced voltage signal of the first receiver coil 330 due to their relative positions. The induced voltage signal of the third receiver coil 350 has a phase shift of 240 degrees relative to the induced voltage signal of the first receiver coil 330 due to their relative positions.

The accuracy of an angular measurement determined by the position sensor system 300 may depend on how well the induced voltage signals match perfect sinusoids given by the equations above. In practice, the induced voltage signals will not be perfect sinusoids. The imperfect sinusoids may be characterized as a sum of harmonics with the higher amplitude harmonic components corresponding to more distortion in the sinusoidal signal. Accordingly, reducing the amplitude of these harmonic components from the inductive angular position sensor 301 may help to increase an accuracy of angular measurement determined by the position sensor system 300.

Figure 4:
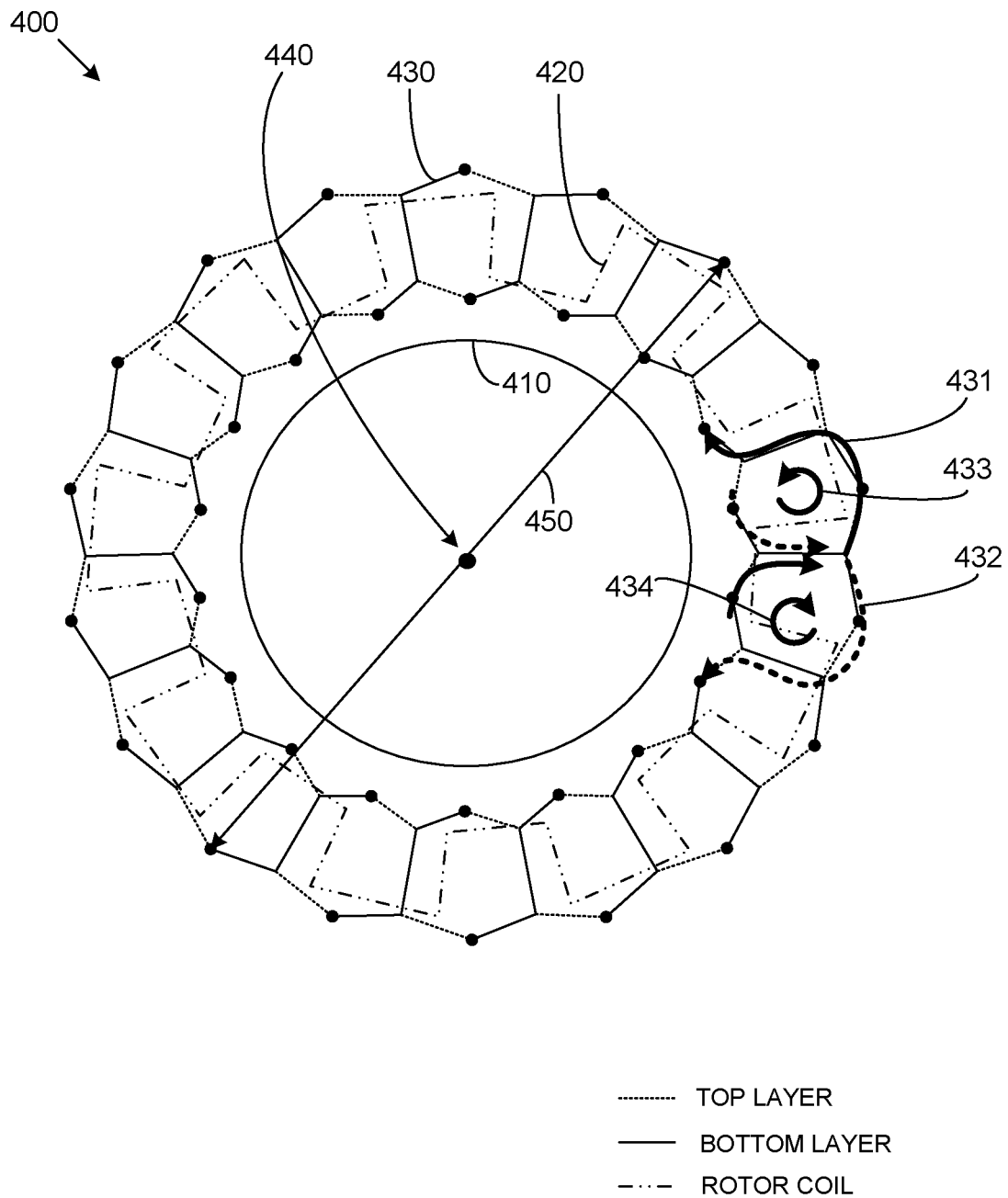
FIG. 4 is a (prior art) schematic of an inductive angular position sensor according to certain embodiments.

FIG. 4 is a schematic of an inductive angular position sensor according to certain embodiments. The inductive angular position sensor is symmetric around an axis-of-symmetry 440 at the center of the coils and has an overall size corresponding to an outer diameter (i.e., diameter 450). The inductive angular position sensor 400 includes an excitation coil 410 that is located inside an annulus defined by a rotor coil 420 and a receiver coil 430 (i.e., stator coil). Although, in other possible implementations the excitation coil could be outside the annulus. For clarity, only one receiver coil 430 is shown.

The excitation coil 410 and the receiver coil 430 can be disposed on a first printed circuit board (PCB) and the rotor coil 420 can be disposed on a second printed circuit board, with an air gap therebetween. The air gap can be less than 1 millimeter (e.g., 100 microns (μm)). The amplitude of harmonic distortion may be inversely proportional to the air gap so sensors with smaller air gaps have more harmonic distortion than sensors having larger air gaps.

The rotor coil 420 includes nine positive lobes and nine negative lobes of equal size (i.e., lobe ratio=50/50) with a period of 40 degrees, while the receiver coil 430 includes nine positive lobes and nine negative lobes of equal size with a period of 40 degrees. In other words, the rotor coil and the receiver coil each have a rotational symmetry of order 9 (i.e., symmetry of 9). In this configuration, 40 degrees change of mechanical rotation of the rotor coil 420 can generate 360 degrees of change in a periodic sinusoidal signal. Accordingly, the fundamental frequency of the inductive angular position sensor 400 is 9, while the resolution of the inductive angular position sensor 400 is based on this period of 40 degrees.

The receiver coil 430 is in a twisted loop configuration that includes a first loop that follows a first path 431 in a counter-clockwise direction around the annulus and a second loop that follows a second path 432 in a clockwise direction around the circumference of the annulus. The first loop and the second loop are prevented from shorting by vias that allow the first loop to be on a top layer of the first PCB while the second loop is on a bottom layer of the first PCB, and vice versa. For example, the first loop can be on the top layer of the first PCB for a first half of each lobe period and on a bottom layer for a second half of each lobe period. Conversely, the second loop can be on the bottom layer of the first PCB for the first half of each lobe period and on the top layer for the second half of each lobe period. Transitions between the top layer and the bottom layer can be implemented using vias (e.g., plated through holes, pins, etc.) through the first PCB.

The twisted loop configuration configures the receiver coil 430 to substantially cancel signals coupled from the excitation coil 410 so that the receiver coil receives signals primarily (e.g., entirely) from the rotor coil 420. The cancellation results because the twisted pair configuration creates a series of loops around the circumference having adjacent loops of opposite (winding) direction. For example, a first loop of the twisted pair may have a counter-clockwise direction 433, while a second loop of the twisted pair that is adjacent to the first loop may have a clockwise direction 434. Additionally, the twisted loop configuration of the receiver coil 430 substantially eliminates even harmonics in the induced voltage signal.

As mentioned, only one receiver coil is shown in FIG. 4. In practice, the inductive angular position sensor 400 may include three receiver coils (i.e., three-phase receiver coils), each disposed on the first PCB at a position (i.e., fixed position) that is rotationally shifted 120 degrees (i.e., ±120°) (i.e., around the axis of symmetry) from the positions of the other two receiver coils. Further, each of the three-phase receiver coils has a twisted loop configuration. The circuitry required to implement the three receiver coils can become complex as the symmetry of the coils is increased. For example, as the symmetry is increased trace widths, via diameters, and trace separations will become very small.

Figure 5:
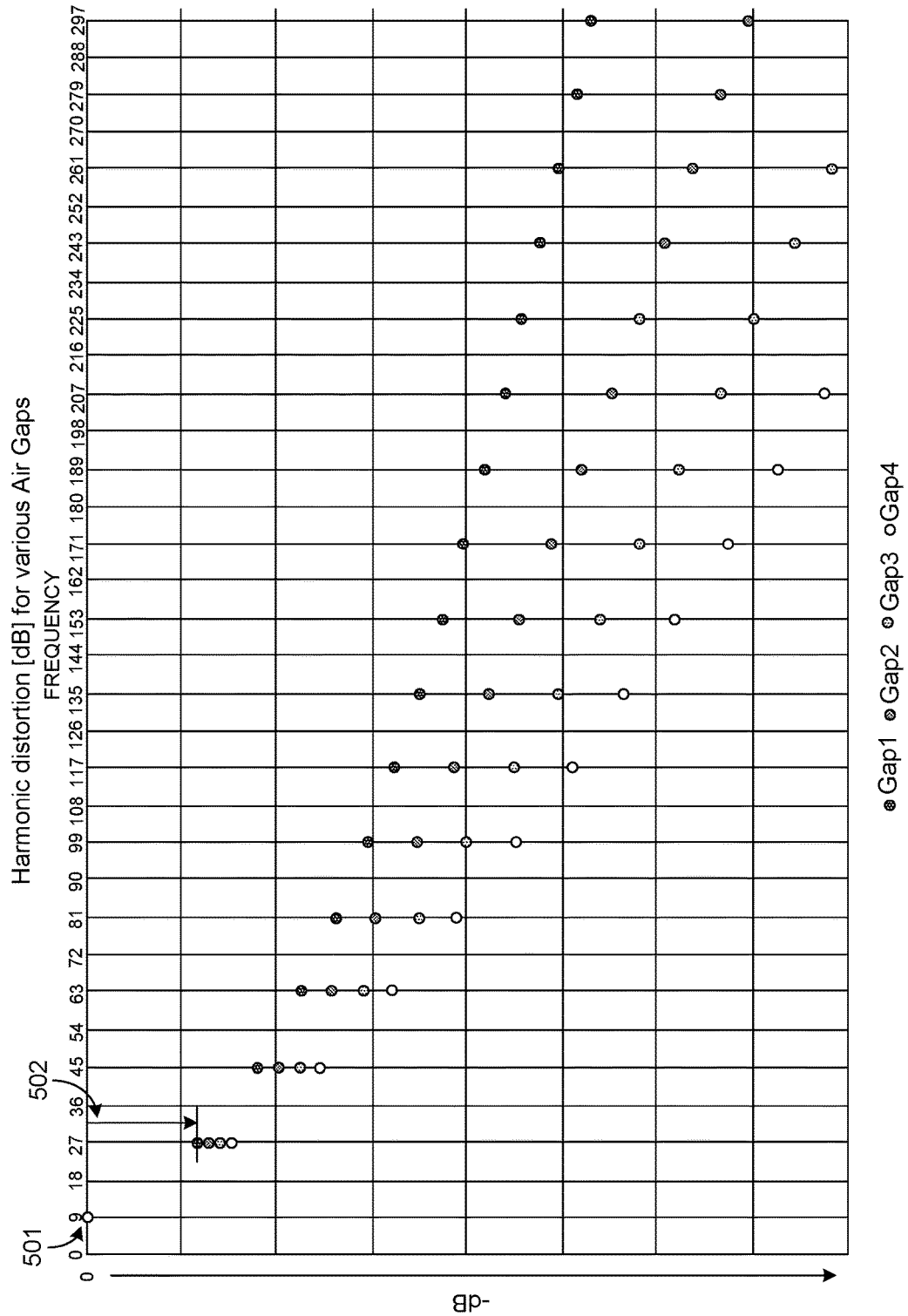
FIG. 5 is a graph of the harmonic content (i.e., harmonic distortion) of signals generated by the inductive angular position sensor of FIG. 4 as a rotor coil is rotated and for different air gaps.

FIG. 5 is a graph of the harmonic content (i.e., harmonic distortion) of signals generated by the inductive angular position sensor 400 of FIG. 4 as a rotor coil is rotated. As shown in FIG. 5, the fundamental frequency 501 of the inductive angular position sensor 400 is nine cycles/revolution (i.e., $F_{FUND}$=9 cycles/rev), which corresponds to the order of rotational symmetry of the rotor/stator. The amplitude of the fundamental frequency is normalized to an amplitude of zero decibels (i.e., 0 dB). Rotation of the rotor coil will also generate harmonics of the fundamental frequency. The frequency content (i.e., frequencies) of the induced voltage signals may be given by the equation below.

$$F_{HARM} = M \cdot F_{FUND}(M=3,5,7,\ldots) \quad (5)$$

In the equation above, M is the order of the harmonic. Only odd orders are included because of the twisted pair configuration of the receiver coil. Higher order frequency components (i.e., M=3, 5, 7, . . . ) can have an ever-decreasing amplitude compared to the fundamental frequency amplitude. The highest amplitude harmonic in this example, has a frequency of 27 and is lower in amplitude (e.g., −12 dB lower) than the fundamental frequency (i.e., 9 cycles/rev). Accordingly, a harmonic suppression 502, as defined herein, may be the difference between the amplitude of the fundamental frequency and the highest amplitude harmonic (e.g., 12 dB). Harmonics for various air gaps (e.g., Gap1=100 μm, Gap2=200 μm, Gap3=300 μm, Gap4=400 μm) are plotted, showing that a rate of decrease of the harmonics increases as the air gap is made larger but that the harmonic suppression 502 is roughly the same (e.g., within a range of 5 dB) for the highest-amplitude harmonic frequency (i.e., 27).

The resolution of the inductive angular position sensor may correspond to the fundamental frequency of the rotor and receiver coil combination. When the order of rotational symmetry of the rotor coil is equal to the order of rotational symmetry of the receiver coil, the fundamental frequency (i.e., lowest frequency of all harmonics) is the order of symmetry (i.e., symmetry) of the two coils. In other words, increasing the symmetry of both coils can increase resolution of the angular measurement. Meeting an increased resolution requirement with an inductive angular position sensor having an order of rotational symmetry of the rotor coil that is the same as an order of rotational symmetry of the receiver coil comes at the expense of circuit complexity, especially for three-phase receiver coils. In other words, increasing the symmetry of both coils to increase resolution can face limitations. The present disclosure describes techniques to avoid these limitations.

The present disclosure describes an inductive angular position sensor in which an order of rotational symmetry of the rotor coil is different from an order of rotational symmetry of the receiver coil. In this case, a higher order harmonic shared by both coils can effectively become the fundamental frequency of the coil combination. The shared higher order harmonic will provide an increased resolution of the angular measurement, even while the symmetry of the receiver is kept low. Further, any reduced measurement amplitude can be compensated for with a smaller offset because harmonic suppression of higher order modes may be larger. TABLE 1 below illustrates harmonics for different rotor coil and receiver coil configurations. The examples shown in TABLE 1 can help understand the principles of the disclosure and are not intended to be limiting.

TABLE 1

Harmonics versus rotor coil and receiver coil orders of rotational symmetry

| Sensor | Rotor Sym. | Rcvr. Sym. | $F_{fund}/\theta_{fund}$ | $F_3/\theta_3$ | $F_5/\theta_5$ | $F_7/\theta_7$ |
|---|---|---|---|---|---|---|
| 1 | 9 | 9 | 9/40° | 27/13° | 45/8.0° | 63/5.7° |
| 2 | 21 | 21 | 21/17° | 63/5.7° | 105/2.9° | 147/2.4° |
| 3 | 21 | 9 | 63/5.7° | 189/1.9° | 315/1.1° | 441/0.8° |

TABLE 1 includes three inductive angular sensors having the same overall size corresponding to the outer diameter (i.e., diameter 450). As shown in TABLE 1, a first inductive angular position sensor (i.e., Sensor 1) has a rotor/receiver coil symmetry of 9. This symmetry combination corresponds to a fundamental frequency of 9 cycles per revolution (cycles/rev) and an angular period of 40 degrees (e.g., see FIG. 2), wherein the angular period corresponds to a range of rotation of the rotor coil that is 360 degrees divided by the symmetry. A second inductive angular position sensor (i.e., Sensor 2) has a rotor/receiver coil symmetry of 21. This symmetry combination corresponds to a fundamental frequency of 21 cycles/rev and an angular period of 17 degrees. In other words, when the symmetry of the rotor coil and the receiver coil are both increased from 9 cycles/rev to 21 cycles/rev, the angular period can be reduced from 40 degrees to 17 degrees. The first inductive angular position sensor has a $7^{th}$ order mode with a frequency of 63 cycles/rev and an angular period of 5.7 degrees, while the second inductive angular position sensor has a 3$^{rd}$ order mode with the frequency of 63 cycles/rev and an angular period of 5.7 degrees.

As shown in TABLE 1, a third angular position sensor (i.e., Sensor 3) has a rotor coil symmetry of 21 and a receiver coil symmetry of 9. For this symmetry combination, the shared higher order mode of the first and second angular position sensors (i.e., 63 cycles/rev) will be the first mode excited in the third inductive angular position sensor. Accordingly, the third angular position sensor has an effective symmetry of 63, a fundamental frequency of 63 cycles/rev. corresponding to an angular period of 5.7 degrees. The resolution of the third angular position sensor is higher than the first angular position sensor without increasing the symmetry of the receiver coil. Further, the resolution of the third angular position sensor is higher than the second angular position sensor with a lower symmetry of the receiver coil.

Figure 6:
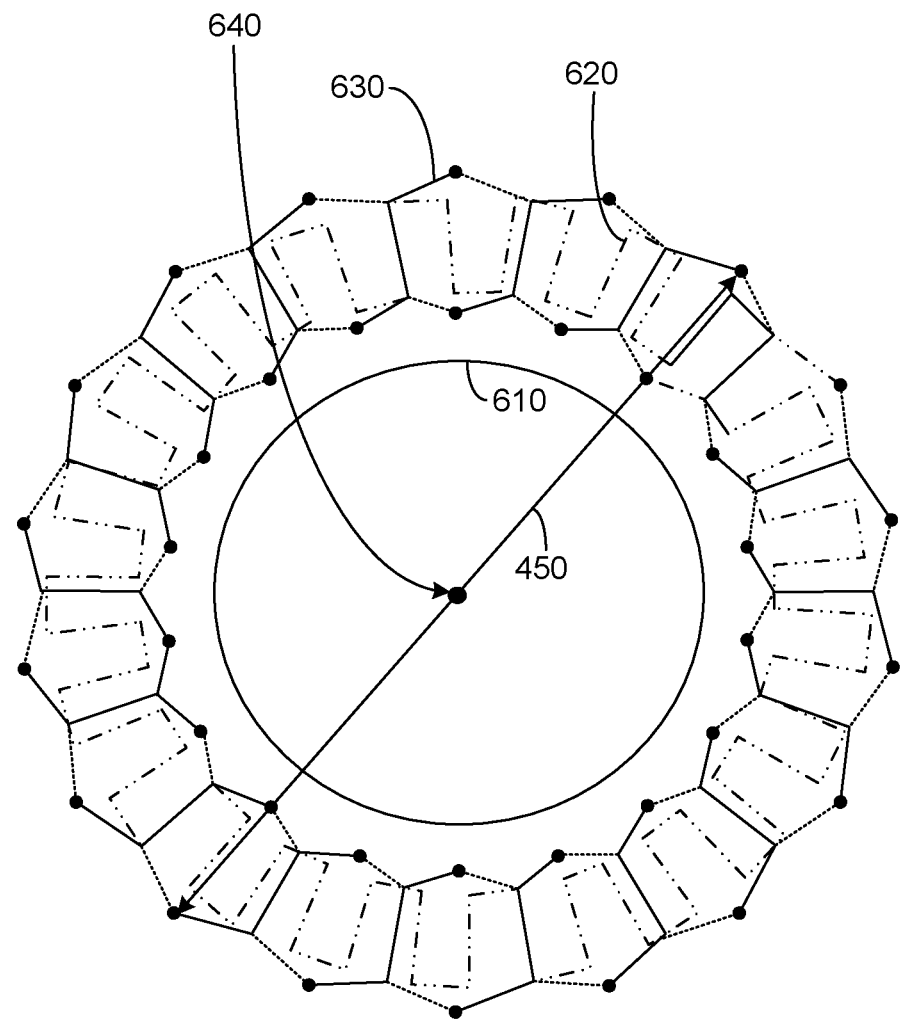
FIG. 6 is a schematic of an inductive angular position sensor according to a possible implementation of the present disclosure.

FIG. 6 illustrates an inductive angular position sensor according to an implementation of the present disclosure. The inductive angular position sensor 600 is symmetric around an axis-of-symmetry 640 at the center of the coils and has an overall size corresponding to an outer diameter (i.e., diameter 450). The inductive angular position sensor 600 includes an excitation coil 610 that is located inside an annulus defined by a rotor coil 620 and a receiver coil 630 (i.e., stator coil). For clarity, only one receiver coil 630 is shown, but in practice a plurality of receiver coils may be used, with each receiver coil disposed at an angular shift relative to other receiver coils (e.g., three-phase receiver coils).

The excitation coil 610 and the receiver coil 630 can be disposed on a first printed circuit board (PCB) and the rotor coil 620 can be disposed on a second printed circuit board, with an air gap (d) therebetween. The air gap can be less than 1 millimeter (e.g., 100 microns (μm)).

The rotor coil 420 includes 21 positive lobes and 21 negative lobes of equal size (i.e., lobe ratio=50/50) with a period of 17 degrees, while the receiver coil 430 includes nine positive lobes and nine negative lobes of equal size with a period of 40 degrees. In other words, the rotor coil 620 has a rotational symmetry of order 21 and the receiver coil(s) has a rotational symmetry of order 9 (i.e., symmetry of 9). In this configuration, 5.7 degrees change of mechanical rotation of the rotor coil 420 can generate 360 degrees of change in a periodic sinusoidal signal. Accordingly, the fundamental frequency of the inductive angular position sensor 600 is 63 cycles/rev, while the resolution of the inductive angular position sensor 600 is based on this period of 5.7 degrees.

The receiver coil 630 is in a twisted loop configuration that includes a first loop that follows a first path in a counter-clockwise direction around the annulus and a second loop that follows a second path in a clockwise direction around the circumference of the annulus. The first loop and the second loop are prevented from shorting by vias that allow the first loop to be on a top layer of the first PCB while the second loop is on a bottom layer of the first PCB, and vice versa. For example, the first loop can be on the top layer of the first PCB for a first half of each lobe period and on a bottom layer for a second half of each lobe period. Conversely, the second loop can be on the bottom layer of the first PCB for the first half of each lobe period and on the top layer for the second half of each lobe period. Transitions between the top layer and the bottom layer can be implemented using vias (e.g., plated through holes, pins, etc.) through the first PCB.

Figure 7:
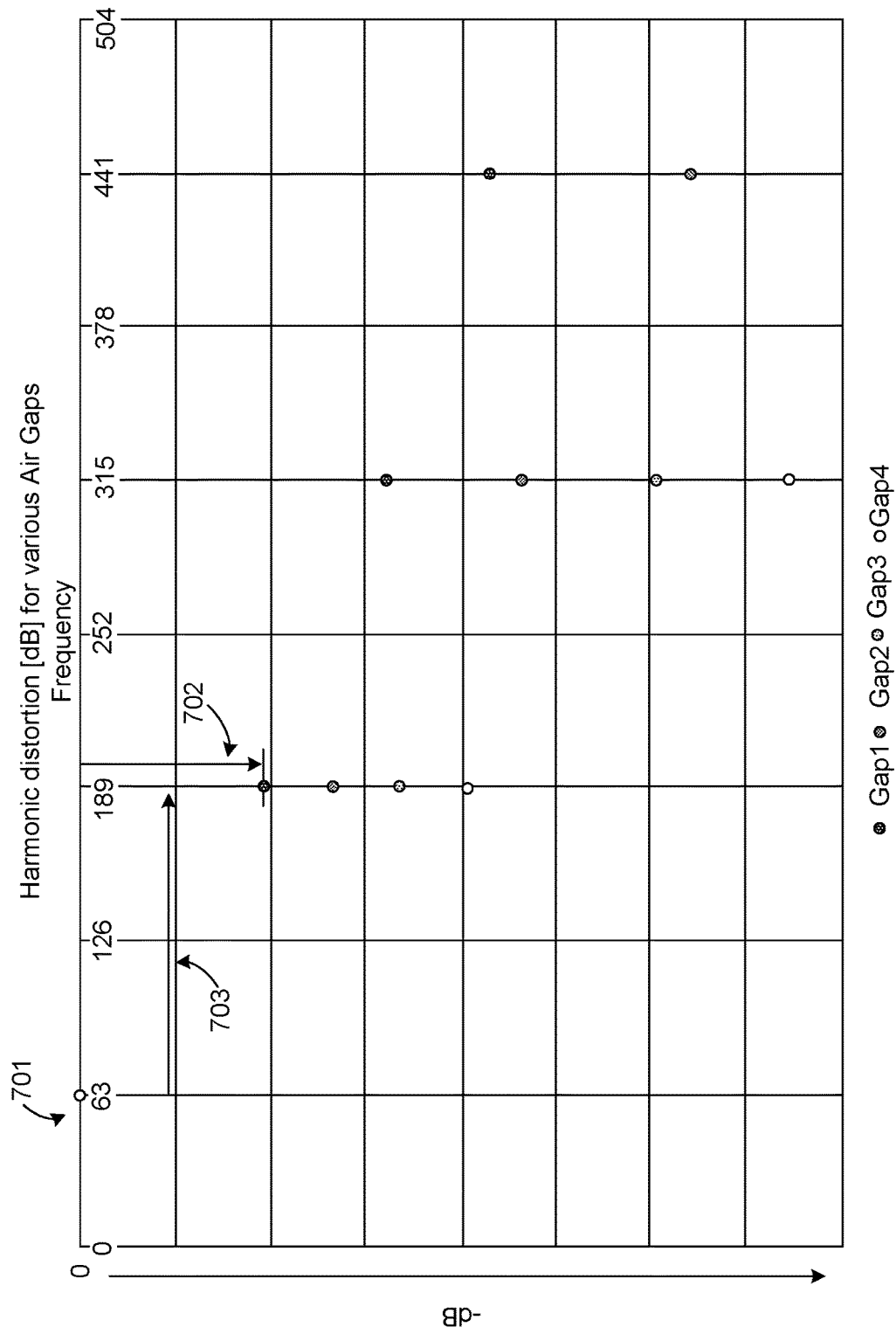
FIG. 7 is a graph of the harmonic content (i.e., harmonic distortion) of signals generated by the inductive angular position sensor of FIG. 6 as a rotor coil is rotated and for different air gaps.

FIG. 7 is a graph of the harmonic content (i.e., harmonic distortion) of signals generated by the third inductive angular position sensor of TABLE 1. As shown in FIG. 7, the fundamental frequency 701 of the inductive angular position sensor is at the harmonic that is the least common multiple (LCM) of the rotor frequency (i.e., 21) and stator (i.e., 9), which in this example is 63 cycles/rev (i.e., 1(LCM)=63) and is normalized to an amplitude of zero decibels (i.e., 0 dB). Rotation of the rotor coil will also generate harmonics of the fundamental frequency. The next higher order harmonic (i.e., 3 (LCM)=189) is at a frequency of 189 cycles/rev, which is well separated from the fundamental frequency by a first harmonic frequency bandwidth (i.e., bandwidth 703) of 126 cycles/rev. The highest amplitude harmonic in this example, has a frequency of 189 cycles/rev and is lower than the fundamental frequency by an amount (e.g., 19 dB) that equals the harmonic suppression 702. Harmonics for various air gaps (e.g., Gap1=100 μm, Gap2=200 μm, Gap3=300 μm, Gap4=400 μm) are plotted, showing that the harmonic suppression of each is spread over a large range (e.g., within a range of 22 dB). The higher order harmonics may be cancelled and further suppressed using multiple rotor windings. In other words, the rotor coil of the angular position sensor may be implemented as a multi-winding rotor coil.

Figure 8:
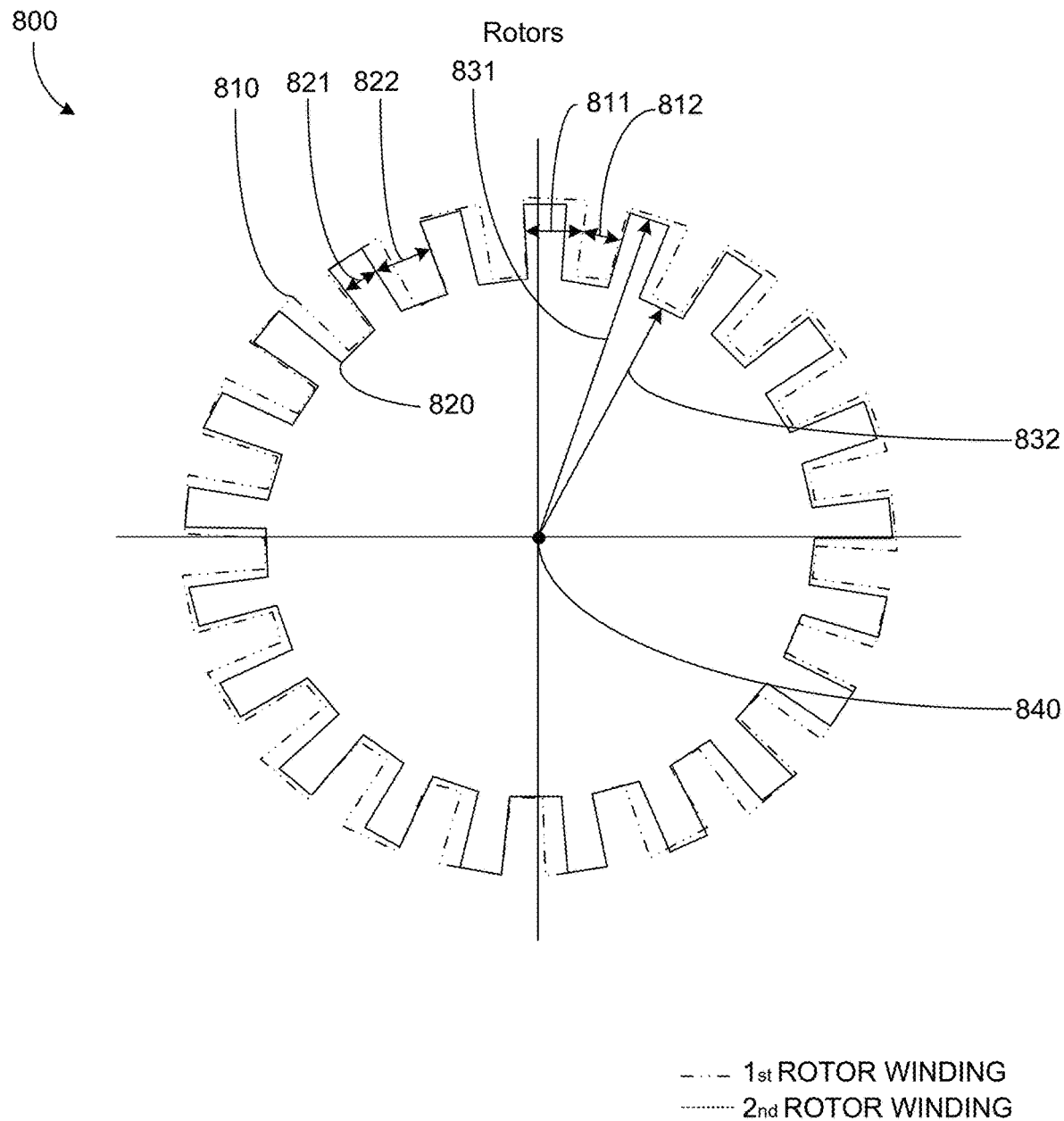
FIG. 8 schematically illustrates a multi-winding rotor coil for an inductive angular position sensor according to a possible implementation of the present disclosure.

FIG. 8 illustrates a multi-winding rotor coil for an inductive angular position sensor according to a possible implementation of the present disclosure. The multi-winding rotor coil 800 includes a first rotor winding 810 and a second rotor winding 820. The first rotor winding 810 and the second rotor winding 820 can be adjacent traces (i.e., not intersecting, not overlapping). For example, the first rotor winding 810 and the second rotor winding 820 may be two continuous traces on a layer (e.g., surface) of a PCB. The first rotor winding 810 and the second rotor winding 820 may define an annulus having an outer radius 831 and an inner radius 832 around an axis of symmetry 840. The first rotor winding 810 and the second rotor winding 820 may have the same frequency (i.e., order) of rotational symmetry. As shown, the first rotor winding 810 and the second rotor winding 820 have a frequency of 21 cycles/rev, where each cycle includes a positive lobe at a radius that is approximately the outer radius 831 and a negative lobe at a radius that is approximately the inner radius 832.

A lobe ratio may be defined as a first portion (e.g., first percentage) of a cycle that is the positive lobe to a second portion (e.g., second percentage) of the cycle that is the negative lobe. As shown, the first rotor winding 810 has a first lobe ratio and the second rotor winding 820 has a second lobe ratio, where the first lobe ratio is different than the second lobe ratio. For the implementation shown in FIG. 8, the first rotor winding 810 has a first positive lobe portion 811 that is 60% of a cycle and a first negative lobe portion 812 that is 40% of the cycle. Accordingly, the first lobe ratio is 60/40. The second rotor winding 820 has a second positive lobe portion 821 that is 40% of the cycle and a second negative lobe portion 822 that is 60% of a cycle. Accordingly, the second lobe ratio is 40/60. The lobe ratios may vary in different implementations. In general, lobe ratios of the windings may be different so that one winding can fit within another winding without overlap. The multi-winding rotor coil 800 can reduce the 5$^{th}$ (M=5) and 7$^{th}$ (M=7) order harmonics through cancellation of the fields coupled to/from the multi-winding rotor. For example, the 5$^{th}$ harmonic can be cancelled by both rotors having a 40/60 lobe ratio, while the 7$^{th}$ harmonic can be cancelled by shifting (i.e., rotating)

one rotor coil relative to the other rotor coil so that the combined coupling of the rotor coils to the receiver coil does not include the $7^{th}$ harmonic.

Figure 9:
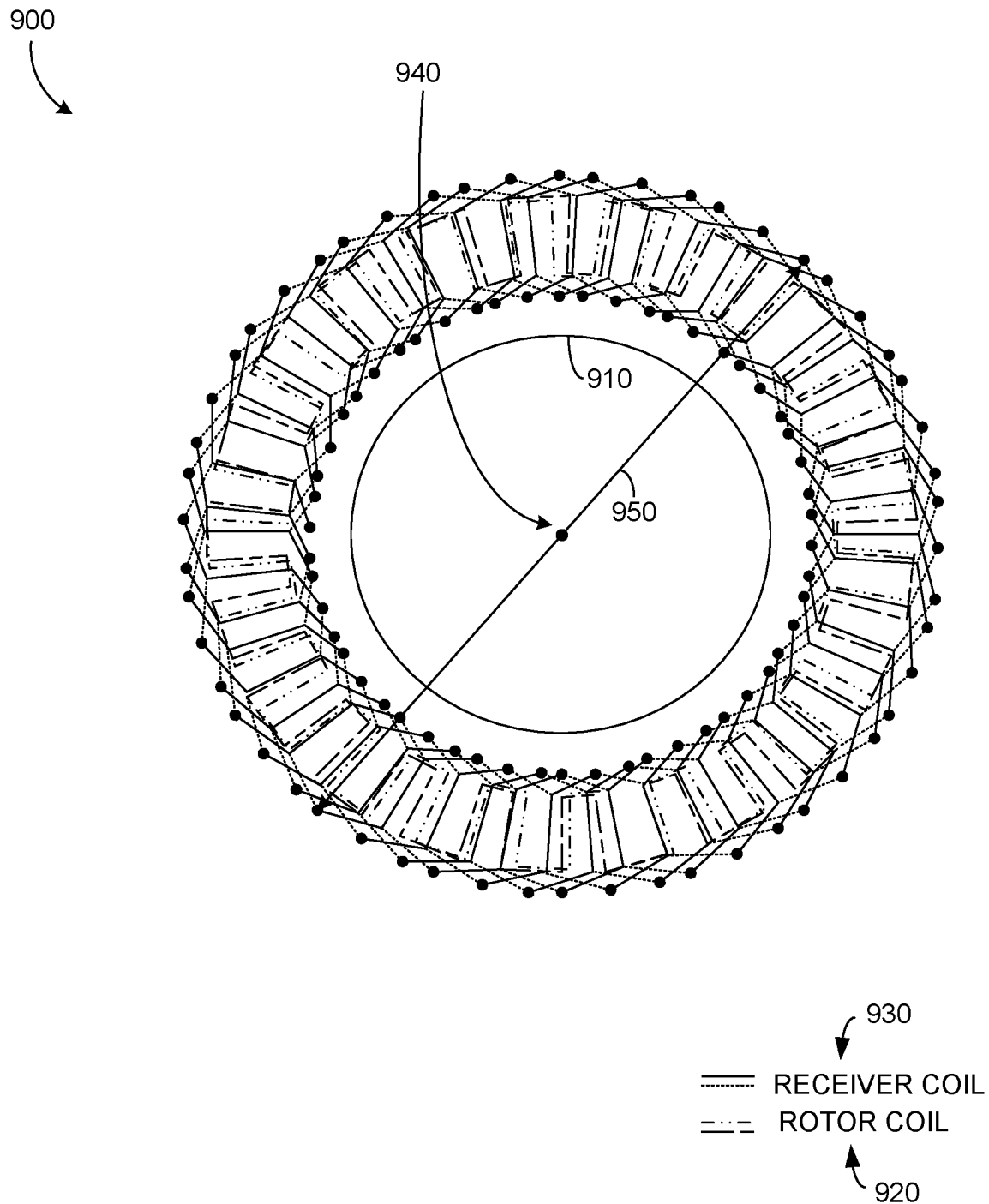
FIG. 9 illustrates an inductive angular position sensor according to a possible implementation of the present disclosure.

FIG. 9 illustrates an inductive angular position sensor according to an implementation of the present disclosure. The inductive angular position sensor 900 is symmetric around an axis-of-symmetry 940 at the center of the coils and has an overall size corresponding to an outer diameter (i.e., diameter 950). The diameter 950 for the implementation shown in FIG. 9 is 38 millimeters. The inductive angular position sensor 900 includes an excitation coil 910 that is located inside an annulus defined by a receiver coil 930 (i.e., stator coil). The excitation coil 910 defines a first plane. The excitation coil 910 and the receiver coil 930 are in approximately the same plane.

The inductive angular position sensor 900 includes a rotor coil that is configured to rotate around the axis of symmetry 940 (e.g., above the receiver coil 930). The rotor coil 920 is substantially planar in a second plane. The first plane and the second plane are separated by an air gap that is 100 microns. The rotor coil 920 is implemented as a multi-winding rotor coil having a first rotor winding and a second rotor winding. The first rotor winding has a first lobe ratio that is different from a second lobe ratio of the second rotor winding. For the implementation shown, the first rotor winding has a first lobe ratio of 60/40 and the second rotor winding has a second lobe ratio of 40/60. The first rotor winding and the second rotor winding have the same number of positive/negative lobes (i.e., frequency, symmetry). For the implementation shown, the rotor symmetry is 21 (i.e., 21 positive lobes, 21, negative lobes). The multi-winding rotor coil is configured to attenuate (e.g., cancel) the $5^{th}$ and $7^{th}$ harmonics in the response of the inductive angular position sensor 900.

The receiver coil 930 of the inductive angular position sensor is implemented as a three-phase receiver coil that includes three receiver coils. Each receiver coil has the same number of positive/negative lobes (i.e., frequency, symmetry). Each of the three receiver coils includes two loops arranged as twisted pair. For the implementation shown, the first loop has a frequency (i.e., symmetry) of 9 and the second loop has a frequency (i.e., symmetry) of 9. Accordingly, the three receiver coils each have a total of 18 loops for a total of 54 loops in a complete rotation around the axis of symmetry. Each loop includes 2 vias so the three-phase receiver coil in a twisted loop configuration, shown in FIG. 9 includes 108 vias. The three receiver coils are arranged spatially with a 120 degree of rotation between the coils. The receiver coil 930 is configured to cancel the even harmonics (i.e., $2^{nd}$, $4^{th}$, $6^{th}$, etc.) as a result of the twisted loop configuration. The receiver coil 930 is configured to cancel the $3^{rd}$, $9^{th}$, $15^{th}$ harmonics as a result of the three-phase configuration.

Figure 10:
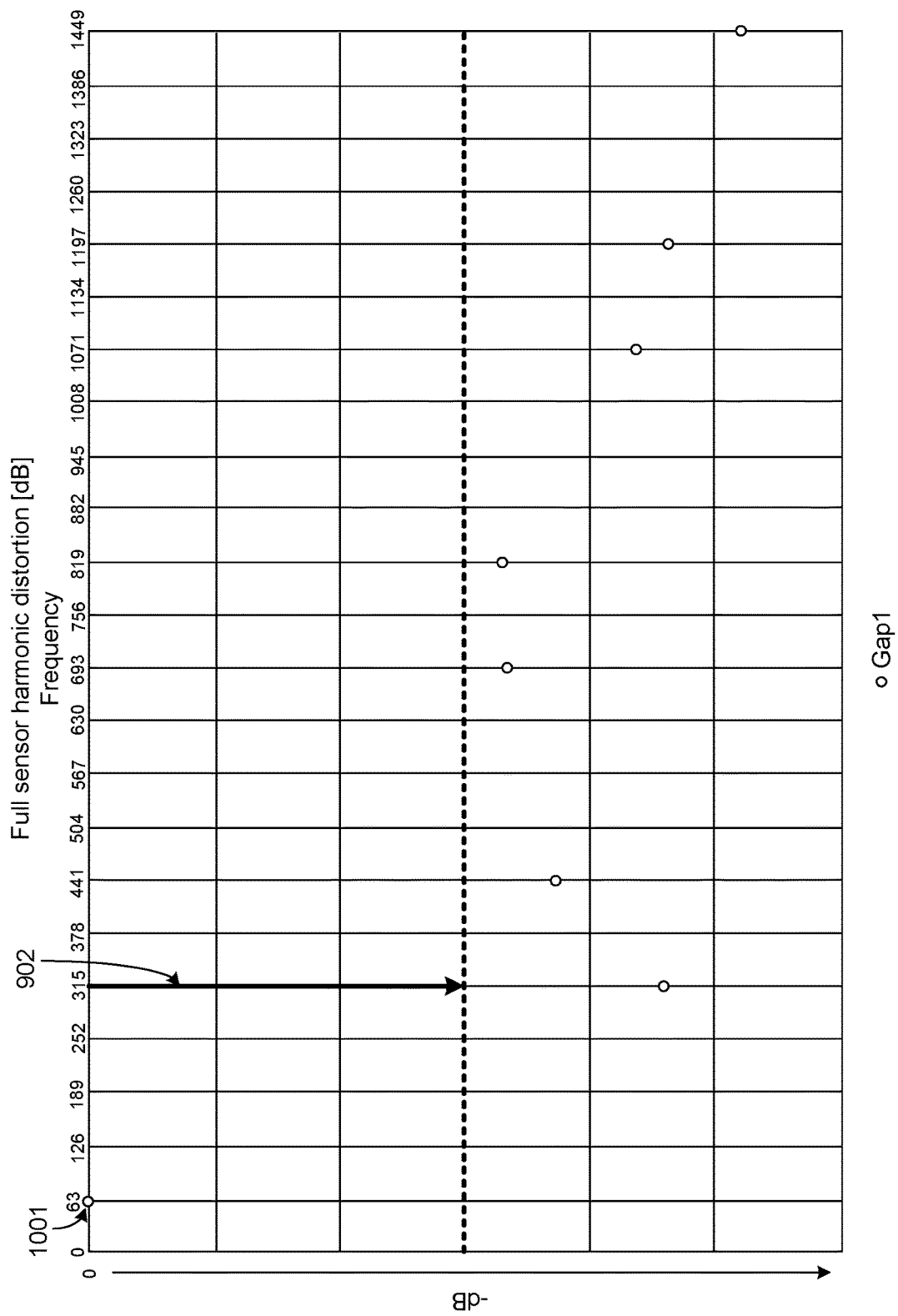
FIG. 10 is a graph of the harmonic content (i.e., harmonic distortion) of signals generated by the inductive angular position sensor of FIG. 9 as a rotor coil is rotated.

FIG. 10 is a graph of the harmonic content (i.e., harmonic distortion) of signals generated by the inductive angular position sensor of FIG. 9. As shown in FIG. 10, the fundamental frequency 1001 of the inductive angular position sensor is 63 cycles/rev (i.e., $F_{FUND}$=63), which is the least common multiple (i.e., LCM) of the rotor coil symmetry (i.e., 21) and the receiver coil symmetry (i.e., 9). In the graph, the amplitude of the fundamental frequency is normalized to zero decibels (i.e., 0 dB) and the harmonic suppression 902 is an amount (e.g., 60 dB) that effectively eliminates the effects of the higher order harmonics. As shown, all harmonics are effectively eliminated due to the cancellation effects described above. For example, (i) the multi-winding rotor coil reduces the $5^{th}$ and $7^{th}$ harmonic to levels well below the fundamental frequency (e.g., >60 dB below); (ii) the three-phase receiver coils reduces the $3^{rd}$, $9^{th}$, and $15^{th}$ harmonics to levels well below the fundamental frequency (e.g., >60 dB below), and (iii) the twisted-loop configuration of each receiver coil eliminates the even harmonics.

This combined harmonic cancelling effects help the angle calculation to generate an angular measurement with very high accuracy. For example, the angle calculation can determine the period with 6-bits of accuracy for the fundamental frequency of 63. Further, the angle calculation can interpolate with an accuracy of (at least) 10-bits when the harmonic suppression is enough to effectively eliminate the higher order harmonics (i.e., harmonic suppression≥60 dB). This can correspond to an angular measurement accuracy of 16 bits, or 20 arcseconds. Such an accuracy, in a small size (e.g., 38 mm diameter) sensor would not be practically possible without the techniques described herein. For example, without the techniques described herein, a high angular measurement accuracy in a small size would require much more complex and expensive PCB circuits.

Figure 11:
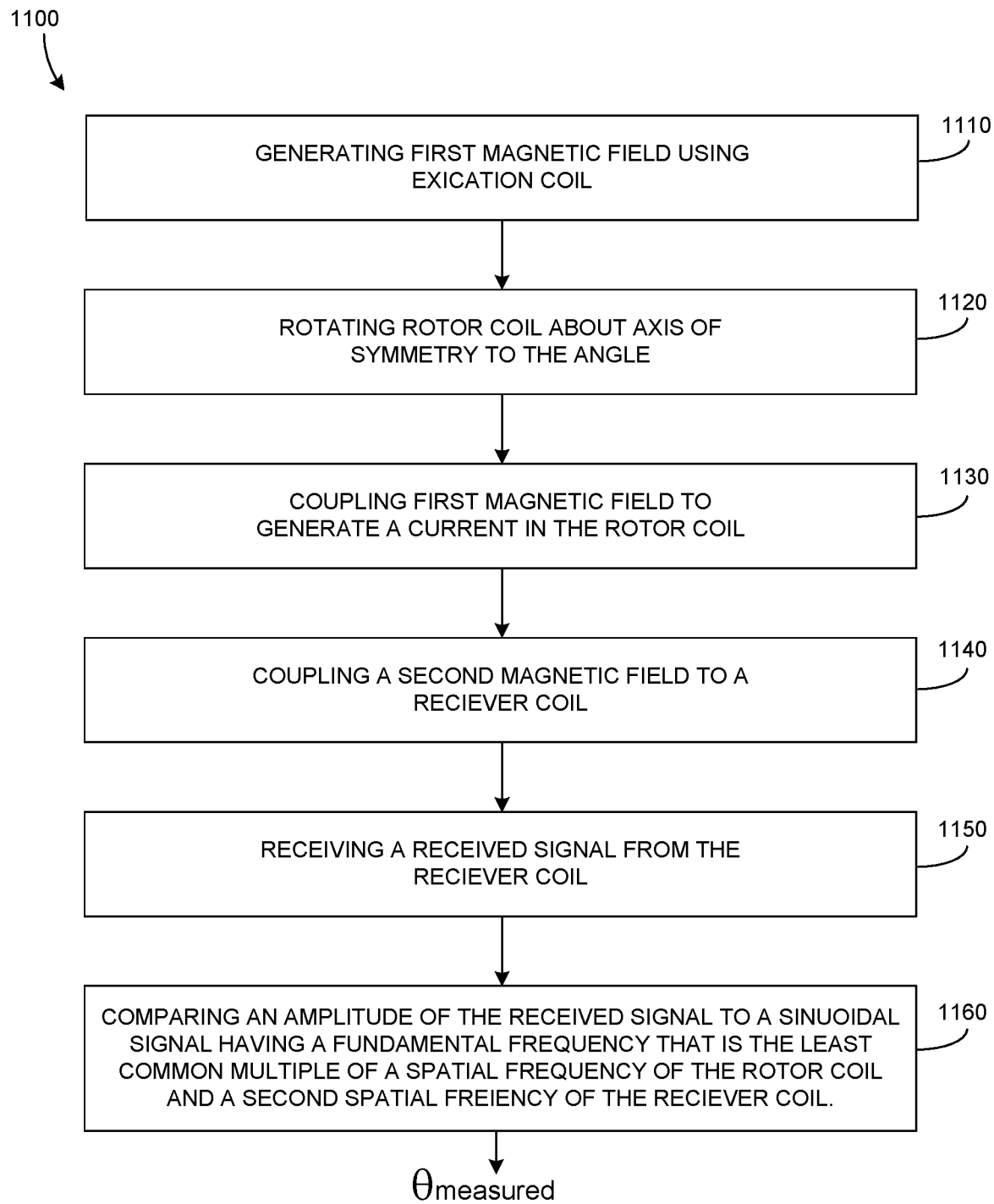
FIG. 11 is a flowchart of a method for measuring an angle according to a possible implementation of the present disclosure.

FIG. 11 is a flowchart of a method for measuring an angle. The method 1100 includes generating 1110 a first magnetic field using an excitation coil located on a first plane. The excitation coil is symmetric about an axis-of-symmetry located at the center of the excitation coil. The method 1100 further includes rotating 1120 a rotor coil about (i.e., around) the axis-of-symmetry to an angle. The rotor coil is located at a second plane, which is parallel to the first plane, and which is separated from the first plane by an air gap. The rotor coil has a first spatial frequency (i.e., first frequency, first symmetry). The method 1100 further includes coupling 1130 the first magnetic field from the excitation coil to the rotor coil to generate a current in the rotor coil. The method 1100 further includes coupling 1140 a second magnetic field generated by the current in the rotor coil to a receiver coil at the first plane, where the receiver coil has a second spatial frequency (i.e., second frequency, second symmetry). The method further includes receiving 1150 a received signal from the receiver coil which has an amplitude corresponding to the angle of the rotor coil. The method further includes comparing 1160 the received signal from the receiver coil to a sinusoidal signal to measure the angle. The sinusoidal signal has a fundamental frequency corresponding to the least common multiple of the first spatial frequency and the second spatial frequency.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. An inductive angular position sensor comprising:
   an excitation coil located at a first plane, the excitation coil having a circular shape around an axis-of-symmetry that intersects the first plane at a center of the excitation coil;
   a multi-winding rotor coil including a first rotor winding and a second rotor winding having a first rotational symmetry of a first order about the axis-of-symmetry, the multi-winding rotor coil located at a second plane separated from the first plane by an air gap and configured to rotate around the axis-of-symmetry, wherein the multi-winding rotor coil is configured to receive an excitation signal from the excitation coil through an exciter-to-rotor inductive coupling; and
   a receiver coil having a second rotational symmetry of a second order about the axis-of-symmetry, the receiver coil located in the first plane and configured to generate a received signal based on a rotor-to-receiver inductive coupling which changes sinusoidally as the multi-winding rotor coil rotates, wherein the first order and the second order are different.

2. The inductive angular position sensor according to claim 1, wherein the second order is less than the first order.

3. The inductive angular position sensor according to claim 1, wherein the received signal has a fundamental frequency that is a least common multiple of the first order and the second order.

4. The inductive angular position sensor according to claim 3, wherein a period of the fundamental frequency corresponds to a range of rotation of the multi-winding rotor coil that is 360 degrees divided by the least common multiple of the first order and the second order.

5. The inductive angular position sensor according to claim 1, wherein the first order of the first rotational symmetry of the multi-winding rotor coil is a multiple of the second order of the second rotational symmetry of the receiver coil.

6. The inductive angular position sensor according to claim 1, wherein the receiver coil is in a twisted loop configuration.

7. The inductive angular position sensor according to claim 6, wherein the receiver coil is a first receiver coil, and the inductive angular position sensor further includes:
   a second receiver coil in the twisted loop configuration that is positioned around the axis-of-symmetry by 120 degrees relative to the first receiver coil; and
   a third receiver coil in the twisted loop configuration that is positioned around the axis-of-symmetry by 240 degrees relative to the first receiver coil.

8. The inductive angular position sensor according to claim 6, wherein the receiver coil includes a trace that alternates between on a top surface of a printed circuit board and a bottom surface of the printed circuit board at vias through the printed circuit board.

9. The inductive angular position sensor according to claim 1, wherein the multi-winding rotor coil and the receiver coil are outside an interior defined by the excitation coil, the interior including an axis of symmetry of the multi-winding rotor coil.

10. The inductive angular position sensor according to claim 1, wherein the multi-winding rotor coil includes the first rotor winding having a first lobe ratio and the second rotor winding having a second lobe ratio.

11. A position sensor system comprising:
    an inductive angular position sensor that includes:
      an excitation coil located at a first plane, the excitation coil having a circular shape around an axis-of-symmetry that intersects the first plane at a center of the excitation coil;
      a multi-winding rotor coil including a first rotor winding and a second rotor winding having a first rotational symmetry of a first order about the axis-of-symmetry, the multi-winding rotor coil located at a second plane separated from the first plane by an air gap and configured to rotate around the axis-of-symmetry, wherein the multi-winding rotor coil is configured to receive an excitation signal from the excitation coil through an exciter-to-rotor inductive coupling; and
      a plurality of receiver coils configured to generate a plurality of received signals, each of the plurality of receiver coils having a second rotational symmetry of a second order about the axis-of-symmetry that is less than the first order, the plurality of receiver coils configured to generate a plurality of received signals;

a transceiver circuit connected to the excitation coil and configured to generate the excitation signal and further configured to receive the plurality of received signals from the plurality of receiver coils, the plurality of received signals having a fundamental frequency that is a multiple of the first order and the second order; and an angle calculation module configured to calculate an angle measurement based on the plurality of received signals.

12. The position sensor system according to claim 11, wherein the fundamental frequency is a least common multiple of the first order and the second order.

13. The position sensor system according to claim 11, wherein the plurality of receiver coils are each in a twisted loop configuration.

14. The position sensor system according to claim 11, wherein the plurality of receiver coils include a first receiver coil, a second receiver coil, and a third receiver coil arranged in a three-phase configuration in which the first receiver coil, the second receiver coil, and the third receiver coil are arranged at 120 degree angles about the axis-of-symmetry with each other.

15. The position sensor system according to claim 14, further including a processing module configured to transform a first received signal from the first receiver coil, a second received signal from the second receiver coil, and a third received signal from the third receiver coil into a pair of quadrature signals.

16. The position sensor system according to claim 11, wherein the multi-winding rotor coil has a first angular period corresponding to the first rotational symmetry and the plurality of receiver coils each have a second angular period corresponding to the second rotational symmetry, and the angle measurement has a resolution that is smaller than the first angular period and the second angular period.

17. The position sensor system according to claim 11, wherein the multi-winding rotor coil includes the first rotor winding having a first lobe ratio and the second rotor winding having a second lobe ratio.

18. A method for measuring an angle comprising:

generating a first magnetic field using an excitation coil located at a first plane, the excitation coil being symmetric about an axis-of-symmetry;

rotating a multi-winding rotor coil about the axis-of-symmetry to the angle, the multi-winding rotor coil at a second plane parallel to the first plane and separated from the first plane by an air gap, the multi-winding rotor coil including a first rotor winding and a second rotor winding having a first spatial frequency;

coupling the first magnetic field from the excitation coil to the multi-winding rotor coil to generate a current in the multi-winding rotor coil;

coupling a second magnetic field generated by the current in the multi-winding rotor coil to a receiver coil at the first plane, the receiver coil having a second spatial frequency;

receiving a received signal from the receiver coil, the received signal having an amplitude corresponding to the angle of the multi-winding rotor coil; and comparing the received signal from the receiver coil to a sinusoidal signal to measure the angle, the sinusoidal signal having a fundamental frequency corresponding to a least common multiple of the first spatial frequency and the second spatial frequency.

19. The method for measuring the angle according to claim 18, wherein the second spatial frequency of the receiver coil is less than the first spatial frequency of the multi-winding rotor coil.

20. The method for measuring the angle according to claim 19, wherein a sensor resolution of the angle is higher than a first resolution corresponding to the first spatial frequency or a second resolution corresponding to the second spatial frequency.

21. The method for measuring the angle according to claim 18, wherein the multi-winding rotor coil includes the first rotor winding having a first lobe ratio and the second winding having a second lobe ratio.

* * * * *